T. Hotchkiss,
Screw Propeller.

No. 63,520. Patented Apr. 2, 1867.

Witnesses:
Jas. A. Ingle
Wm. Burnell.

Inventor:
Truman Hotchkiss
By A. V. Ely atty

United States Patent Office.

TRUMAN HOTCHKISS, OF STRATFORD, CONNECTICUT, ASSIGNOR TO ALFRED B. ELY, OF NEWTON, MASSACHUSETTS.

Letters Patent No. 63,520, dated April 2, 1867.

IMPROVEMENT IN FRICTION-WHEELS.

The Schedule referred to in these Letters Patent and making part of the same.

Be it known that I, TRUMAN HOTCHKISS, of Stratford, in the State of Connecticut, have invented a new and useful Improvement in Friction-Rolls or Wheels, of which the following, with the accompanying drawings, is a full description.

Figure 2:
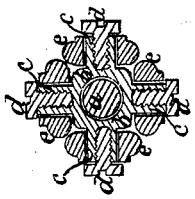
Figure 2 is a vertical section, at right angles to the axis.
Figure 1:
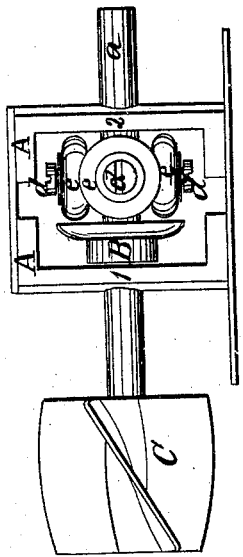
Figure 1 is a side elevation.

My invention is intended to operate where there is a pressure to be exerted in the direction of the axis or spindle, and is useful for propellers, turn-tables, or other cases where the spindle revolves. It consists of a loose collar placed upon an axis, with a series of radial axes extending from the collar outward, upon which are placed loose wheels retained upon these axes by screws inserted in their ends. The peripheries of these wheels revolve upon permanent or fixed shoulders or collars or plates through which the main axis passes.

In the drawings, $a$ is the main axis, passing through the uprights 1 2 in the frame A A. $b\ b$ is a loose collar placed upon the main axis between the uprights and between the fixed plate 2 and a fixed collar, B, upon the main axis. Radiating from the loose collar $b\ b$ is a series of axes, $c\ c\ c\ c$. Upon these axes are placed loose wheels $e\ e\ e\ e$, which are held on by means of the heads of screws $d\ d\ d\ d$, which are inserted in the radial axes. C represents a propeller on the end of the main shaft.

When used for this purpose, the push of the propeller being towards the frame, the wheels and collar operating as described, the friction will be greatly lessened.

What I claim, and desire to secure by Letters Patent, is—

The loose collar and wheels, constructed and operating substantially as described.

In witness whereof I have signed my name to the above specification and claims.

TRUMAN HOTCHKISS.

Witnesses:
CLAUDIUS B. CURTIS,
ELBERT WELLS.